United States Patent [19]
Kubo

[11] Patent Number: 5,909,787
[45] Date of Patent: Jun. 8, 1999

[54] ELECTROMAGNETIC CLUTCH

[75] Inventor: Tsutomu Kubo, Osaka, Japan

[73] Assignee: Mita Industrial Co., Ltd., Osaka-fu, Japan

[21] Appl. No.: 08/854,568

[22] Filed: May 12, 1997

[30] Foreign Application Priority Data

Jun. 24, 1996 [JP] Japan .................................. 8-163362

[51] Int. Cl.$^6$ .................................................. F16D 27/10
[52] U.S. Cl. ................................. 192/84.96; 192/109 R
[58] Field of Search .......................... 192/84.94, 84.96, 192/84.961, 84.9, 109 R, 89.25

[56] References Cited

U.S. PATENT DOCUMENTS

| | | | |
|---|---|---|---|
| 2,808,917 | 10/1957 | Harter | 192/84.9 X |
| 2,966,977 | 1/1961 | Johnson | 192/84.94 X |
| 2,970,681 | 2/1961 | Timmcke | 192/84.96 X |
| 3,007,561 | 11/1961 | Harting | 192/84.96 X |
| 3,429,409 | 2/1969 | Leblanc | 192/84.96 X |
| 3,438,471 | 4/1969 | Wrensch | 192/84.96 X |
| 3,789,966 | 2/1974 | Miller | 192/84.96 X |
| 4,704,554 | 11/1987 | Nishimura | 192/81 C X |
| 4,984,668 | 1/1991 | Onishi et al. | 192/84.94 X |
| 5,031,745 | 7/1991 | Nishimura | 192/81 C X |
| 5,609,232 | 3/1997 | Brownfield et al. | 192/84.9 |
| 5,762,173 | 6/1998 | Nishimura | 192/84.961 |

*Primary Examiner*—Charles A. Marmor
*Assistant Examiner*—Scott Lund
*Attorney, Agent, or Firm*—Jordan and Hamburg LLP

[57] ABSTRACT

Disclosed is an electromagnetic clutch comprising a field member with an exciting coil member disposed therein; a shaft extending through the field member and the exciting coil member; a rotor member fixedly disposed on the shaft at a position opposing to the filed member; a drive mechanism rotatably provided on the shaft; a contact member provided on the drive mechanism on the side facing the rotor member; an elastic member disposed on the drive mechanism for biasing the contact member to the drive mechanism. The contact member is positioned to form a clearance of a first dimension G1 along the shaft between the surfaces of the contact member and the rotor member and the first dimension G1 is set to be smaller than a limit dimension G3. A deformation of the elastic member by the limit dimension along the axial direction results in the elastic limit. The electromagnetic clutch has a restricting member provided on the drive mechanism for restricting a displacement of the contact member along the axial direction of the shaft to be less than a second dimension G2. The dimension G2 is set within a range between the first dimension G1 and the limit dimension G3.

11 Claims, 3 Drawing Sheets

ELECTROMAGNETIC CLUTCH

BACKGROUND OF THE INVENTION

This invention relates to an electromagnetic clutch and more particularly to an electromagnetic clutch having an excellent impact strength.

An arrangement of a conventional electromagnetic clutch is shown in FIG. 3. The electromagnetic clutch shown in this figure is employed in a sheet feed mechanism of a copying machine and the like. The electromagnetic clutch comprises a field member 32 in the form of a double-layered cylinder with a bottom surface. The field member 32 has a hollow cylindrical casing 31 extending in an axial direction thereof inside. Inside the field member 32, there is mounted an annular exciting coil 33 (energizing member) on an outer circumference of the casing 31. A first shaft 34 having a through hole 34a extending in an axial direction of the field member 32 is rotatably inserted in the hollow portion of the casing 31.

The first shaft 34 is fixedly mounted with a rotor 36 at one axial end thereof. The rotor 36 is formed with through holes 35 in the form of slot and opposes to the exciting coil 33. A second shaft 37 whose axial length is larger than the first shaft 34 is inserted in the through hole 34a and is fixedly mounted to the first shaft 34 by fastening means, thereby rendering the second shaft 37 rotatable together with the first shaft 34.

A drive force transmitter 38 formed with a gear wheel around an outer periphery thereof is fixedly mounted to the second shaft 37 to be rotatable about the rotary axis of the second shaft 37. The drive force transmitter 38 is concentrically mounted with a contact member 39 with a plate spring (as an elastic member) 40 in the form of a ring interposed therebetween. The contact member 39 is biased to the drive force transmitter 38 by a biasing force of the spring 40, and is disposed opposing to the rotor 36 by a certain distance (clearance).

The thus constructed electromagnetic clutch is operated as follows. Upon being supplied with a power from a drive power source (not shown), the drive force transmitter 38 is rotated together with the contact member 39 around the rotary axis of the second shaft 37. At this time, when a power is supplied to the exciting coil 33 to energize (excite) the same, a flux of magnetic induction is generated around the energized coil 33 and along a magnetic passage defined by the field member 32, first shaft 34 and rotor 36. The rotor 36 attracts the contact member 39 against the biasing force of the spring 40 by leakage magnetic flux passed through the holes 35 of the rotor 36. As a result, the rotor 36 is rotated together with the rotating drive force transmitter 38, thereby rotating the second shaft 37 and the first shaft 34 to which the rotor 36 is fixedly attached.

On the other hand, when the power supply to the exciting coil 33 is suspended, i.e., the exciting coil 33 is deenergized, the magnetic flux disappears, and the magnetic attraction force of the rotor 36 to attract the contact member 39 thereto also disappears. As a result, the contact member 39 is returned to the drive force transmitter 38 by the biasing force of the spring 40, i.e., away from the rotor 36 by the certain clearance. Consequently, even though the drive force transmitter 38 keeps rotating, the rotating force of the transmitter 38 is not transmitted to the first shaft 34 and the second shaft 37, i.e., the rotation of these shafts 34 and 37 is suspended.

The above constructed electromagnetic clutch has the following drawback. There may be the possibility that the drive force transmitter 38 mounted with the contact member 39 is inadvertently dropped on a floor during assembly of the electromagnetic clutch. Also, there may be the possibility that an assembled electromagnetic clutch is inadvertently dropped on a floor during a step of assembling a copying machine (i.e., mounting the electromagnetic clutch to the copying machine).

In such case, it is highly likely that the spring 40 is deformed or bent beyond an elastic limit of the spring 40 owing to a physical impact (stress) applied to the drive force transmitter 38 of the half-way assembled electromagnetic clutch or to the completed assembled electromagnetic clutch when the clutch hits the floor and the like, with the result that part or entire part of the contact member 39, which is mounted to the drive force transmitter 38 with the spring 40 interposed therebetween, is protruded toward the rotor 36. The protrusion (displacement) of the spring toward the rotor side is enhanced by the mass of the contact member. In other words, the greater the mass of the contact member, the larger the displacement of the spring towards rotor side becomes when the impact force is applied to the drive force transmitter. If such an incident occurs, the contact member 39 constantly comes into contact with the rotor 36, thus losing the function as the electromagnetic clutch.

SUMMARY OF THE INVENTION

In view of the above, it is an object of the invention to solve the above drawback residing in the prior art.

It is another object of the invention to provide an electromagnetic clutch which has the capability of effectively suppressing a positional displacement of a contact member relative to a rotor member due to an elastic deformation of a spring mounted to a drive force transmission member, even if a great physical stress is given to the drive force transmission member mounted with the contact member.

To accomplish the above objects, an electromagnetic clutch comprises a field member with an exciting coil member disposed therein; a shaft extending through the field member and the exciting coil member; a rotor member fixedly disposed on the shaft at a position opposing to the filed member; a drive mechanism rotatably provided on the shaft; a contact member provided on the drive mechanism on the side facing the rotor member; an elastic member disposed on the drive mechanism for biasing the contact member to the drive mechanism; the contact member is positioned to form a clearance of a first dimension G1 along the shaft between the surfaces of the contact member and the rotor member and the first dimension G1 is set to be smaller than a limit dimension G3, a deformation of the elastic member by the limit dimension along the axial direction resulting in the elastic limit; and a restricting member provided on the drive mechanism for restricting a displacement of the contact member along the axial direction of the shaft to be less than a second dimension G2 and the dimension G2 is set within a range between the first dimension G1 and the limit dimension G3.

With this arrangement, even in a case where a great physical stress is given to the drive mechanism, the restricting member restricts the movement amount of the contact member toward the rotor member against the biasing force of the elastic member within a value not exceeding the maximum deformable amount of the elastic member. Thereby, there can be assuredly restricted an axial positional displacement of the contact member within the elastic limit of the elastic member toward the rotor member.

The above and other objects, features and advantages of the present invention will become more apparent upon a reading of the following detailed description and drawings.

DETAILED DESCRIPTION OF THE PREFERRED EMBODIMENTS OF THE INVENTION

Figure 1:
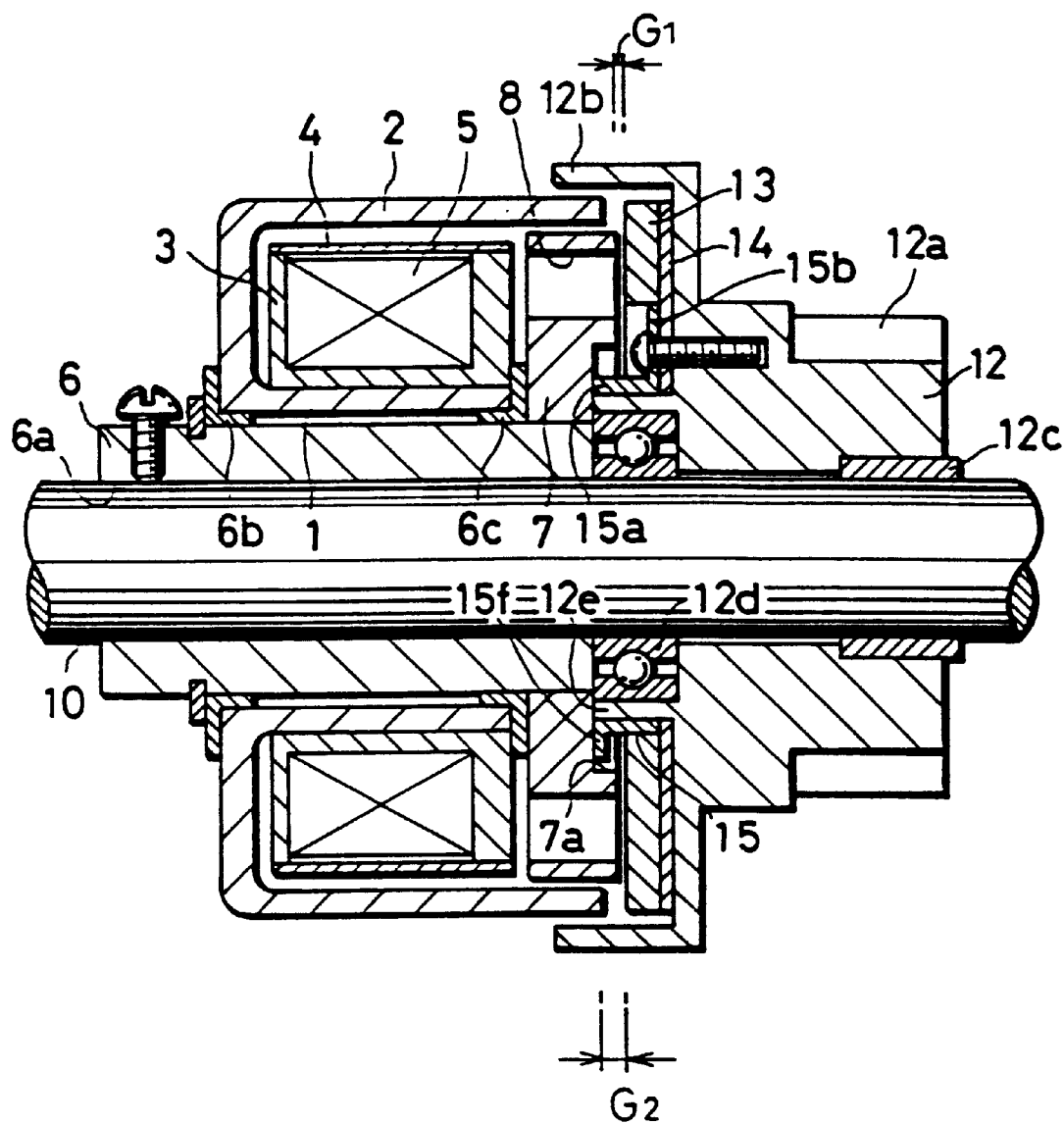
FIG. 1 is a cross sectional view of an embodiment of an electromagnetic clutch according to this invention.

FIG. 1 is a cross sectional view of an electromagnetic clutch embodying the present invention. In this figure, the electromagnetic clutch has a field member 2 with a hollow double-layered cylindrical construction and a bottom surface. The field member 2 includes a cylindrical casing 1 extending in the axial direction thereof and is formed with a hollow portion inside. Inside the field member 2, an annular exciting coil (energizing member) 5 is fittingly mounted on an outer circumference of the casing 1. The exciting coil 5 is constructed such that a lead wire is wound around a bobbin 3 made of an insulating material and an outer surface of the wound wire is shielded with an insulator 4 in the form of a sheet.

Through the hollow portion of the casing 1, there is inserted a first shaft 6 rotatably supported by bearings 6b and 6c arranged at opposite axial ends of the casing 1. The first shaft 6 is formed with a through hole 6a extending in the axial direction of the casing 1. A rotor 7 is fixedly attached to one axial end of the first shaft 6 at a position opposing to the exciting coil 5. The rotor 7 also has an annular shape whose outer diameter is similar to the exciting coil 5. The rotor 7 is formed with holes 8 (in FIG. 1, only one hole is shown) each in the form of a slot. The holes 8 are equidistantly formed along an outer periphery of the rotor 7 and inside the outer peripheral end.

Through the through hole 6a of the first shaft 6, there is inserted a second shaft 10 whose axial length is larger than the first shaft 6. The second shaft 10 is fixedly mounted to the first shaft 6 by fastening means such as a screw, thereby making the first and second shafts 6 and 10 rotatable together. The second shaft 10 is mounted with a drive force transmission member 12 (as a drive member) at a position opposing to the rotor 7.

The drive force transmission member 12 comprises a gear wheel portion 12a and an housing portion 12b of the contact member. The gear wheel portion 12a is formed on the outer periphery of the drive force transmission member 12 away from the rotor 7 (in FIG. 1, right side), and the housing portion 12b of the contact member is formed at a position close to the rotor 7 (in FIG. 1, left side) as to oppose to the rotor 7. The drive force transmission member 12 is mounted on the second shaft 10 while being rotatably supported by a slide bearing 12c of the gear wheel portion 12a and a ball bearing 12d of the housing portion 12b of the contact member, thereby being freely rotatable about the rotary axis of the second shaft 10 in case electromagnetic force is not generated in the exciting coil in the field 2.

The contact member housing portion 12b is provided with a bearing housing portion 12e in the form of ring protruding in the axial direction of the shaft 10. The bearing housing portion 12e is formed in such a shape as to accommodate the ball bearing 12d in the middle thereof. A contact member 13 in the form of a flat ring is concentrically provided around the outer circumference of the bearing housing portion 12e.

The contact member 13 is mounted to the drive force transmission member 12 with a hollow disk shaped spring 14 sandwiched therebetween, and opposes to the rotor 7 away therefrom by a certain clearance of a first dimension $G_1$ (e.g., in the range of 0.2 to 0.3 mm) when the exciting coil 5 is not energized.

On the contrary, when being applied with the magnetic force, that overcomes the biasing force of the spring 14 when the exciting coil 5 is energized, to move the contact member 13 toward the rotor 7, the contact member 13 is moved to the rotor 7 against the biasing force of the spring 14, thereby coming into contact with the rotor 7. Then, when the force to move the contact member 13 toward the rotor 7 is ceased (e.g., the exciting coil 5 is put into a deenergized state), the contact member 13 restores its initial state where the contact member 13 is spaced apart from the rotor 7 by the certain clearance of the first dimension $G_1$ by the recovering force of the spring 14.

More specifically, the clearance of dimension $G_1$ is set to such a value smaller than a maximum deformable amount of the spring 14 without going through the permanent deformation (i.e., deformation beyond the elastic limit) when the spring 14 is given a force to attract the contact member 13 toward the rotor 7 away from the drive force transmission member 12.

There exists a certain clearance between the bearing housing portion 12e and the contact member 13. In the clearance, there is interposed a restricting member 15.

Figure 2:
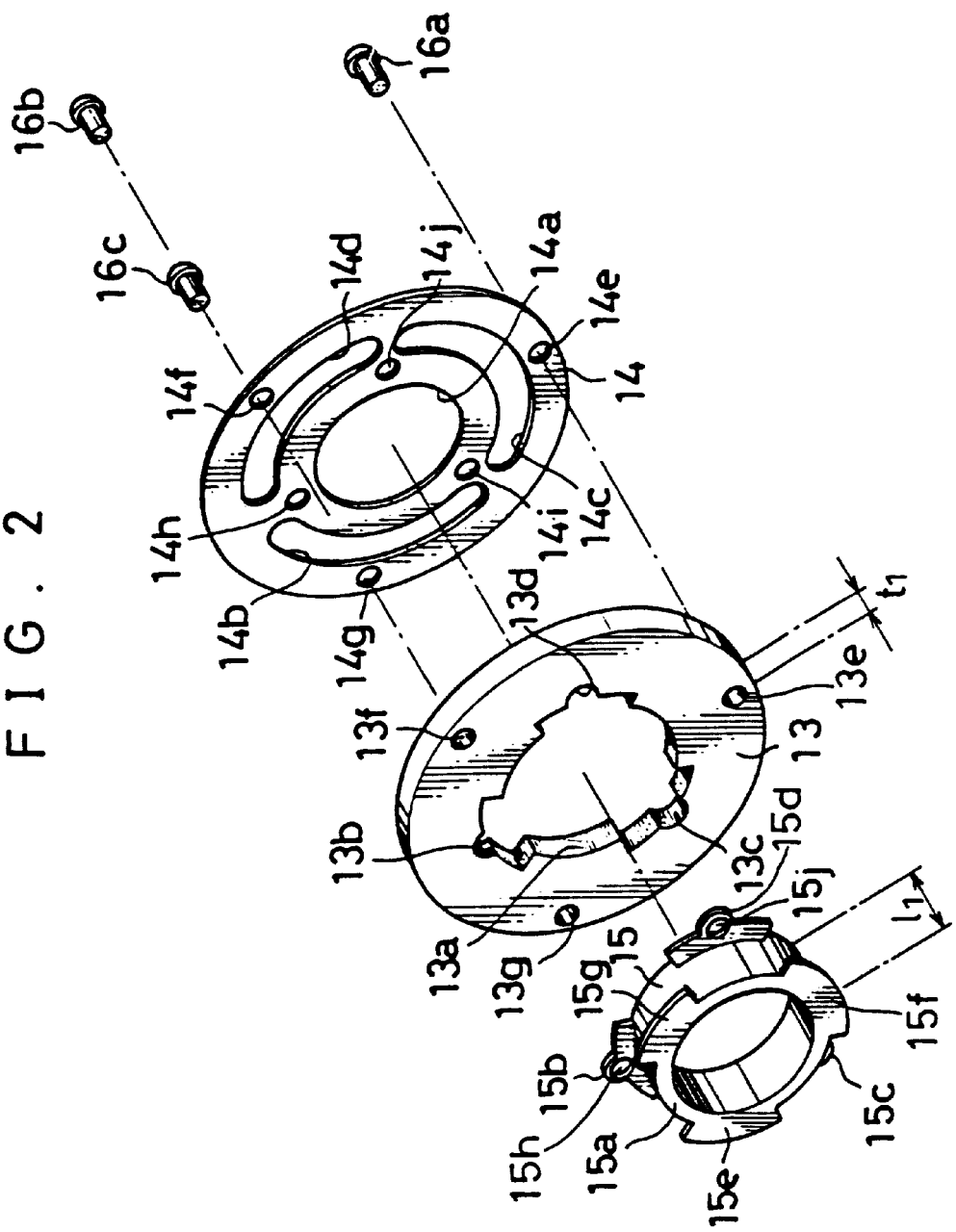
FIG. 2 is an exploded perspective view showing constituent members accommodated in a housing portion of the contact member of a drive force transmission member adapted in the electromagnetic clutch.
Figure 3:
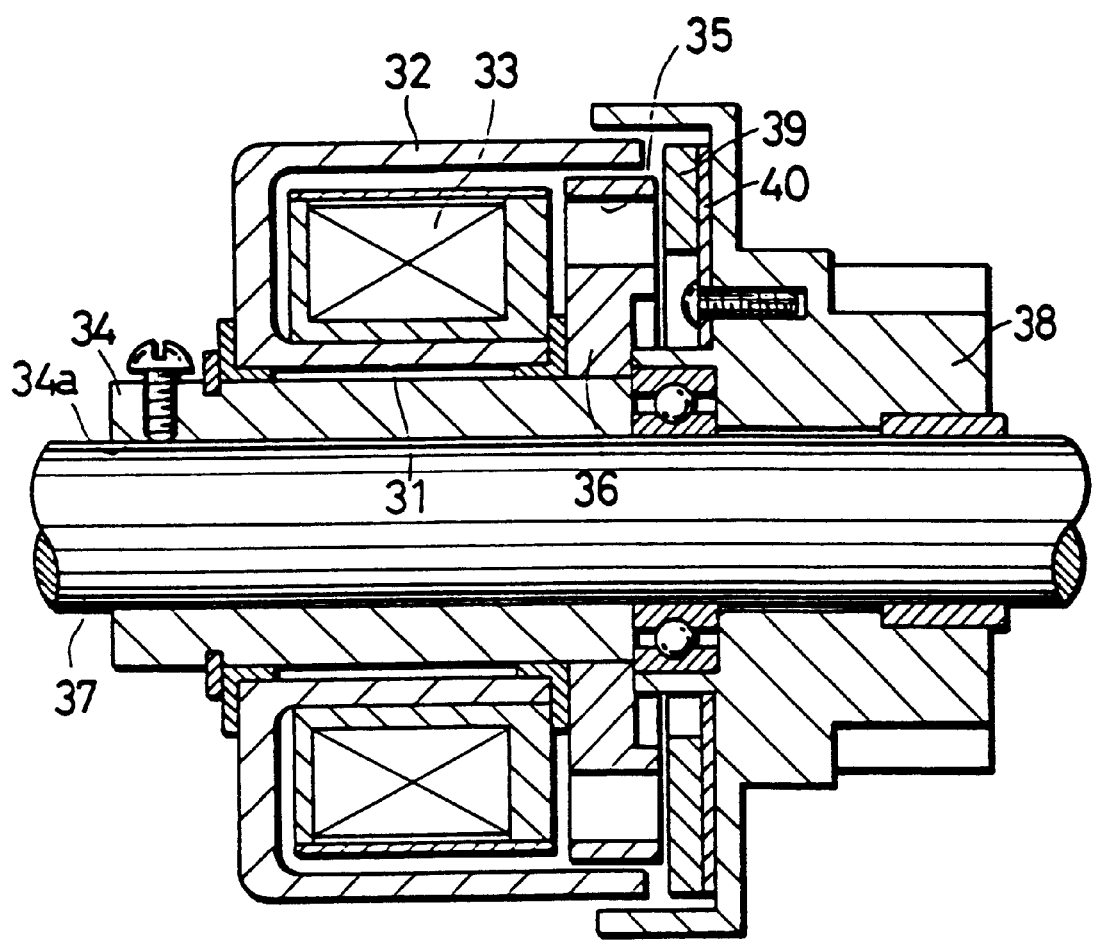
FIG. 3 is a cross sectional view of an electromagnetic clutch of the prior art.

FIG. 2 is an exploded perspective view showing constituent members housed in the housing portion 12b of the contact member. An arrangement of the constituent members is described in details with reference to FIG. 2.

The contact member 13 is formed with a through hole 13a at a center thereof, and is formed with three indent portions 13b, 13c, 13d in an circumferential end of the through hole 13a equidistantly from one another. The indent portions 13b, 13c, and 13d are formed in such a shape and size as to be fittingly engageable with corresponding mounting portions (projections) 15b, 15c, and 15d of the restricting member 15 to be described later. The contact member 13 is further formed with pin insertion holes 13e, 13f, and 13g at such a position that the hole 13e opposes to the indent portion 13b, the hole 13f opposes to the indent portion 13c, and the hole 13g opposes to the indent portion 13d with respect to the through hole 13a.

The spring 14 is formed with a through hole 14a at a center thereof smaller than the through hole 13a of the contact member 13, and is further formed with three holes 14b, 14c, and 14d each in the form of an arc at a position between the through hole 14a and the outer periphery of the spring 14. Thus, the spring 14 has a double annular construction.

The spring 14 is formed with pin insertion holes 14e, 14f, and 14g at a position corresponding to the insertion holes 13e, 13f, and 13g of the contact member 13, respectively, while being formed with fastening member (screw) insertion holes 14h, 14i, and 14j at a position corresponding to recesses of the indent portions 13b, 13c, and 13d of the contact member 13.

Pins 16a, 16b, and 16c are respectively inserted through the insertion holes 13e, 13f, and 13g of the contact member 13 via the insertion holes 14e, 14f, and 14g of the spring 14. Thereby, the spring 14 at which the pins are provided is fixedly mounted to the contact member 13.

The restricting member 15 has an axial length $l_1$ larger than the thickness $t_1$ of the contact member 13, and is formed with a tubular body 15a, the mounting portions 15b, 15c, and 15d, and flange portions 15e, and 15f, and 15g. The tubular body 15a has an outer diameter large enough to be fittingly inserted through the through hole 13a of the contact member 13. The mounting portions 15b, 15c, and 15d are formed equidistantly along a circumferential end of the tubular body 15a of the restricting member 15 on the side of the drive force transmission member 12 (on the right side in FIG. 2) to be projected radially outward.

The flange portions 15e, 15f, and 15g are formed equidistantly along the opposite circumferential end of the tubular body 15a (on the left side in FIG. 2) of the restricting member 15 at an asymmetrical position with respect to the mounting portions 15b, 15c, and 15d to be projected radially. The flange portions 15e to 15g (constituting a first flange member) are adapted for restricting movement of the contact member 13 in the leftward axial direction of the restricting member 15 in FIG. 2. The mounting portions 15b, 15c, and 15d (constituting a second flange member) are respectively formed with pin insertion holes 15h, 15i, and 15j (in FIG. 2, only two holes 15h and 15j are shown) corresponding to the recesses of the indent portions 13b, 13c, and 13d of the contact member 13 and the pin insertion holes 14h, 14i, and 14j of the spring 14.

The restricting member 15 is fitted in the contact member 13 such that the body 15a is fittingly mounted in the through hole 13a of the contact member 13 in a state that the mounting portions 15b, 15c, 15d of the restricting member 15 are respectively enclosed in the indent portions 13b, 13c, and 13d of the contact member 13. At the same time, the restricting member 15 is fastened to the drive force transmission member 12 together with the spring 14 by means of fastening means such as screws in a state that the insertion holes 15h, 15i, 15j of the mounting portions 15b, 15c, 15d are respectively positioned relative to the insertion holes 14h, 14i, 14j of the spring 14.

In this state, the flange portions 15e, 15f, and 15g of the restricting member 15 face the contact member 13 at a position on the circumferential end of the through hole 13a where the indent portions 13b, 13c, and 13d are not formed, i.e., at a displaced position away from these indent portions 13b to 13d. Further, between the front surface (in FIG. 2, left side surface) of the contact member 13 and the rear surface (in FIG. 2, right side surface) of the flange portions 15e to 15g, there is defined a clearance $G_2$ (e.g., in the range of 0.3 to 0.5 mm) which is larger than the clearance $G_1$ defined between the rotor 7 and the contact member 13, as shown in FIG. 1.

Specifically, the clearance of the second dimension $G_2$ is set to such a value that is greater than the clearance of the dimension $G_1$ and within the range of a limit dimension corresponding to an elastic limit of the spring 14 when the spring 14 is given an external force to bring the spring 14 away from the drive force transmission member 12. In other words, the dimension of $G_2$ is set less than the maximum deformable amount (equal to the limit dimension) of the spring 14. Further, the axial length $l_1$ of the restricting member 15 and the thickness $t_1$ of the flange portions 15e to 15g are set such that there is formed the dimension $G_2$ within the aforementioned range.

With this arrangement, when the exciting coil 5 is energized, the contact member 13 is allowed to be moved to the rotor 7 by the magnetic attraction force of the rotor 7 and to come into contact with the rotor 7. However, before mounting the drive force transmission member 12 attached with the contact member 13 on the second shaft 10, there can be assuredly prevented a movement of the contact member 13 toward the rotor 7 beyond the elastic limit of the spring 14.

The rotor 7 on its side surface opposing to the contact member 13 is formed with a circular recess 7a around the periphery of the first shaft 6. When the drive force transmission member 12 is mounted to the second shaft 10, the flange portions 15e, 15f, and 15g of the restricting member 15 are accommodated in the recess (or recesses) 7a of the rotor 7. Thereby, when the exciting coil 5 is energized, the contact member 13 is smoothly attracted to the rotor 7 without an interference of the flange portions 15e to 15g, because the flange portions 15e to 15g of the restricting member 15 are accommodated in the recess 7a of the rotor 7.

It may be preferable that at least the field member 2, first shaft 6, rotor 7, and contact member 13 are made of a magnetized material such as a ferrous material, while the drive force transmission member 12 and the restricting member 15 are made of a non-magnetized material such as a resin.

With the electromagnetic clutch thus constructed, the drive force transmission member 12 is rotated about the axis of the second shaft 10 driven by a drive power source (not shown). Then, when a power is supplied to the exciting coil, i.e., the exciting coil 5 is energized, a flux of magnetic induction is generated around the energized exciting coil 5 and along a magnetic passage defined by the field member 2, first shaft 6 and rotor 7. The rotor 7 attracts the contact member 13 against the biasing force of the spring 14 by leakage magnetic flux passed through the holes 8 of the rotor 7. As a result, the rotor 7 is rotated together with the rotating drive force transmission member 12, thereby rotating the second shaft 10 and the first shaft 6 to which the rotor 7 is fixedly attached.

On the other hand, when the power supply to the exciting coil is suspended and the exciting coil 5 is put into a deenergized state, the magnetic flux disappears, and the magnetic attraction force of the rotor 7 also disappears. As a result, the contact member 13 is returned to the drive force transmission member 12 by the biasing force of the spring 14, thereby rendering the contact member 13 apart from the rotor 7 by the predetermined clearance $G_1$. Accordingly, even though the drive force transmission member 12 keeps rotating, the rotation of the first shaft 6 and the second shaft 10 is suspended.

The thus constructed electromagnetic clutch has the following advantages. Even in a case that the drive force transmission member 12 mounted with the contact member 13 (half-way assembled state of the electromagnetic clutch) is inadvertently dropped on a floor during assembly of the clutch or an electromagnetic clutch in a completely assembled state is inadvertently dropped on a floor during assembly of a copying machine (i.e., mounting of the electromagnetic clutch to the copying machine), and a great physical stress is given to the drive force transmission member 12 and to the electromagnetic clutch, there can be assuredly prevented the drawback that the contact member 13 is moved to the rotor 7 beyond the elastic limit of the spring 14 against the biasing force of the spring 14, because the restricting member 15 restricts the movement amount of the contact member 13 within the predetermined range.

Accordingly, there can be effectively suppressed the phenomenon that the contact member 13 is greatly displaced relative to the rotor 7 (protruded toward the rotor 7) from the normal state where the contact member 13 and the rotor 7 are set apart by the certain dimension $G_1$ due to the inadvertent impact force generated on the drive force transmission member when dropped on the floor or other reasons, and the electromagnetic clutch having an excellent durability against an impact force can be obtained.

As mentioned above, the restricting member 15 includes the tubular body 15a disposed between the contact member 13 and the bearing housing portion (doughnut-like projection) 12e, the mounting potions 15b, 15c, 15d formed at the one axial end of the tubular body 15a engageable with the contact member 13 to be fittingly mounted to the drive force transmission member 12, and the flange portions 15e, 15f, 15g formed at the opposite axial end of the tubular body 15a for restricting the axial movement of the contact member 13. Accordingly, a positional displacement of the contact member 13 relative to the rotor 7 can be suppressed within an elastic limit of the spring 14 with a simplified construction.

Further, since the flange portions 15e to 15g of the restricting member 15 are accommodated in the recess 7a of the rotor 7 which is formed as opposed to the contact member 13, as shown in this embodiment, the contact member 13 can be smoothly attracted to the rotor 7 without an interference of the flange portions 15e to 15g when power is supplied to the exciting coil 5.

In the foregoing embodiment, the field member 2 and the rotor 7 are mounted to the first shaft 6, and the drive force transmission member 12 is mounted to the second shaft 10. However, the arrangement is not limited to the above. It may be appreciated that the field member 2, rotor 7, drive force transmission member 12 are all mounted to a common single shaft.

Further, in the above embodiment, the restricting member 15 is arranged between the contact member 13 and the bearing housing portion 12e to be fixedly mounted to the drive force transmission member 12 together with the spring 14. This arrangement is advantageous in that a working efficiency in assembling the electromagnetic clutch can be improved, because the spring 14 and the restricting member 15 are fixedly mounted to the drive force transmission member 12 by the same fastening means.

The above positional relationship is not limited to the above. For example, the inner diameter of the tubular body 15a of the restricting member 15 may be set to such a dimension as to accommodate the contact member 13 therein, whereas the restricting member 15 may be disposed around the outer circumference of the contact member 13 inside the housing portion 12b of the contact member 13.

Alternatively, the restricting member 15 may be merely formed with a flange portion for restricting an axial movement of the contact member 13. The restricting member 15 may be fixedly mounted to the contact member 13 by fittingly engaging the flange portion of the restricting member 15 with a recess (groove) formed around an inner circumferential surface of the housing portion 12b of the contact member.

In the foregoing embodiment, the drive force transmission member 12 is mounted to the second shaft 10 while being rotatably supported by the slide bearing 12c and the ball bearing 12d, thereby being rotatable about the rotary axis of the second shaft 10. However, a slide bearing similar to the slide bearing 12c may be used in place of the ball bearing 12d.

Although the present invention has been fully described by way of example with reference to the accompanying drawings, it is to be understood that various changes and modifications will be apparent to those skilled in the art. Therefore, unless otherwise such change and modifications depart from the scope of the invention, they should be construed as being included therein.

What is claimed is:

1. An electromagnetic clutch comprising:

a field member with an exciting coil member disposed therein;

a shaft extending through the field member and the exciting coil member;

a rotor member fixedly disposed on the shaft at a position opposed to the field member;

a drive mechanism rotatably received on the shaft;

a contact member provided on the drive mechanism on a side thereof facing the rotor member;

an elastic member fixedly connected to the contact member and disposed on the drive mechanism for biasing the contact member to the drive mechanism;

the contact member being positioned to form a clearance of a first dimension along the shaft between opposed surfaces of the contact member and the rotor member, the first dimension being set smaller than a limit dimension representing a distance of travel of the contact member away from the drive mechanism along an axial direction of the shaft translating into a maximum deformable amount of the elastic member, a deformation of the elastic member by movement of the contact member away from the drive mechanism an amount corresponding to the limit dimension resulting in reaching an elastic limit of the elastic member; and a restricting member provided on the drive mechanism for restricting a displacement of the contact member along the axial direction of the shaft a distance less than a second dimension, the second dimension being set within a range between the first dimension and the limit dimension, movement of the contact member away from the drive mechanism being restricted to the distance less than the second dimension prior to reception of the drive mechanism on the shaft, thereby preventing deformation of the elastic member beyond the elastic limit thereof by an external force applied thereto.

2. An electromagnetic clutch according to claim 1, wherein:

the drive mechanism includes a bearing housing into which a bearing is fitted to support the drive mechanism on the shaft;

the contact member is disposed outwardly around the bearing housing; and the restricting member includes a tubular portion to be fitted onto an outer surface of the bearing housing, a first flange member at one end of the tubular member to be engageable with a side surface of the contact member, and a second flange member at the other end of the tubular member for attaching the restricting member to the drive mechanism.

3. An electromagnetic clutch according to claim 2, wherein a recess is formed on the rotor member on a side facing the contact member for enclosing the first flange member of the restricting member therein.

4. An electromagnetic clutch according to claim 1, wherein:

the elastic member is a hollow disk shaped spring; and the contact member is disk shaped and is fixed to the elastic member at a first radial distance thereof.

5. An electromagnetic clutch according to claim 4, wherein:

the elastic member includes an arc shaped hole formed at a second radial distance thereof, the first radial distance being greater than the second radial distance.

6. An electromagnetic clutch according to claim 4, wherein:

the restricting member is cylindrically shaped and includes a first flange at an end thereof facing the rotor, and a second flange at a remaining end thereof facing the drive mechanism.

7. An electromagnetic clutch according to claim 6, wherein:

the second flange is fixed to the drive mechanism with the elastic member disposed therebetween at a third radial distance.

8. An electromagnetic clutch according to claim 7, wherein:

an outer diameter of the contact member is substantially equal to that of the elastic member.

9. An electromagnetic clutch according to claim 7, wherein:

the elastic member includes an arc shaped hole formed at a second radial distance thereof, the third radial distance being smaller than the second radial distance.

10. An electromagnetic clutch, comprising:

a field member including an exciting coil member disposed therein;

a shaft extending through the field member and the exciting coil member;

a rotor member fixedly disposed on the shaft at a position therealong opposed to the field member;

a drive force transfer mechanism including a drive member rotatably received on the shaft, an elastic member mounted to the drive member and disposed on a side of the drive member facing the rotor member when the drive force transfer mechanism is received on the shaft, and a contact member fixedly carried on the elastic member in a position radially outward of a position of attachment of the elastic member to the drive member, the elastic member normally biasing the contact member towards the side of the drive member, the contact member being movable away from the drive member in an axial direction of the drive force transfer mechanism by deformation of the elastic member initiated by an applied force;

the drive force transfer mechanism further including a restricting member which presents a stop for restricting a displacement of the contact member away from the drive member to a restrictive distance in the axial direction prior to a reception of the drive force transfer mechanism on the shaft, the restrictive distance being less than a limit dimension representative of a maximum deformable amount of the elastic member beyond which the elastic member exceeds an elastic limit thereof and is permanently deformed, the elastic member being thereby protected against permanent deformation caused by an externally applied force thereto prior to mounted reception of the drive force transfer mechanism on the shaft; and the contact member being positioned relative the rotor member to form a clearance of an operational distance in the axial direction between opposed surfaces of the contact member and the rotor member when the drive force transfer mechanism is mountably received on the shaft, the operational distance being smaller than the restrictive distance, whereby once the drive force transfer mechanism is received on the shaft, movement of the contact member in a direction towards, and subsequent engagement of the contact member with, the rotor member is unimpeded by the stop of the restrictive member, while protection of the elastic member against permanent deformation is maintained by the operational distance between the contact member and the rotor member.

11. A method of preventing damage to an elastic member during assembly of an electromagnetic clutch, the electromagnetic clutch including a field member, a shaft extending through the field member, a rotor member fixedly disposed on the shaft at a position therealong opposed to the field member, and a drive force transfer mechanism including a drive member rotatably received on the shaft, the drive force transfer mechanism further including the elastic member mounted to the drive member and disposed on a side of the drive member facing the rotor member when the drive force transfer mechanism is received on the shaft, and a contact member fixedly carried in a position radially outward of a position of attachment of the elastic member to the drive member, the elastic member normally biasing the contact member towards the side of the drive member, the contact member being movable away from the drive member in an axial direction of the drive force transfer mechanism by deformation of the elastic member initiated by an applied force, the method comprising the steps of:

disposing a stop on the drive force transfer mechanism which limits movement of the contact member away from the drive member to a restrictive distance prior to mounted reception of the drive force transfer mechanism on the shaft, a resultant deformation of the elastic member when the contact member is moved the restrictive distance being less than an elastic limit beyond which the elastic member experiences permanent deformation, thereby protecting the elastic member from movement beyond the elastic limit thereof; and mounting the drive force transfer mechanism on the shaft in a position in which opposed surfaces of the contact member and the rotor member are separated by an operational distance less that the restrictive distance, whereby movement of the contact member in a direction towards, and subsequent engagement of the contact member with, the rotor is unimpeded by the stop of the restrictive member, the stop, once the dive force transfer mechanism is mounted on the shaft, being separated from the contact member by the restrictive distance and being farther in the axial direction from the contact member than a contact member engaged surface of the rotor member.

* * * * *